United States Patent [19]
Okatani

[11] Patent Number: 5,701,548
[45] Date of Patent: *Dec. 23, 1997

[54] COPYING SYSTEM USING A REMOTE DEVICE FOR CONTROLLING AN OPERATION OF A COPIER

[75] Inventor: Toru Okatani, Kobe, Japan

[73] Assignee: Minolta Co., Ltd., Osaka, Japan

[*] Notice: The term of this patent shall not extend beyond the expiration date of Pat. No. 5,440,371.

[21] Appl. No.: 382,903

[22] Filed: Feb. 2, 1995

Related U.S. Application Data

[62] Division of Ser. No. 35,235, Mar. 22, 1993, Pat. No. 5,440,371.

[30] Foreign Application Priority Data

Mar. 26, 1992 [JP] Japan .................. 4-102180

[51] Int. Cl.⁶ .................................................. G03G 15/00
[52] U.S. Cl. ............................................................. 399/8
[58] Field of Search .................. 355/203–209, 355/202; 399/8

[56] References Cited

U.S. PATENT DOCUMENTS

| | | | |
|---|---|---|---|
| 4,025,906 | 5/1977 | Riikonen | 340/172.5 |
| 4,583,834 | 4/1986 | Seko et al. | 355/202 |
| 5,016,059 | 5/1991 | Smeiman | 355/308 |
| 5,164,767 | 11/1992 | Suzuki | 355/200 |
| 5,250,984 | 10/1993 | Masai | 355/202 |
| 5,260,742 | 11/1993 | Kikkawa | 355/202 |
| 5,286,955 | 2/1994 | Klosa | 235/380 |
| 5,331,580 | 7/1994 | Miller et al. | 364/708.1 |
| 5,398,257 | 3/1995 | Groehteman | 375/200 |
| 5,465,213 | 11/1995 | Ross | 364/468 |
| 5,481,249 | 1/1996 | Sato | 340/825.06 |

*Primary Examiner*—William J. Royer
*Attorney, Agent, or Firm*—Burns, Doane, Swecker & Mathis, LLP

[57] ABSTRACT

Disclosed is a copying system wherein operation modes of a copying machine are set using an IC card located at a distance from the copying machine. The IC card has: a transmitter for transmitting a signal that contains an identification code for identifying the IC card itself, an identification code for identifying the copying machine, and pre-stored operation mode setting information for the copying machine; a receiver for receiving a signal transmitted from the copying machine; and a CPU for identifying the copying machine and its operating condition. The copying machine has: a transmitter for transmitting a signal that contains an identification code for identifying the copying machine itself, an identification code for identifying the IC card, and information concerning the operating condition of the copying machine itself; a receiver for receiving a signal transmitted from the IC card; and a CPU for identifying the originating IC card and for setting the copying machine operation mode.

43 Claims, 9 Drawing Sheets

5,701,548

COPYING SYSTEM USING A REMOTE DEVICE FOR CONTROLLING AN OPERATION OF A COPIER

This application is a divisional, of application Ser. No. 08/035,235, filed Mar. 22, 1993 now U.S. Pat. No. 5,440,371.

BACKGROUND OF THE INVENTION

1. Field of the Invention

The present invention relates to a system wherein operation modes of a copying machine are set using an IC card.

2. Description of Related Art

It is known in the prior art to provide a copying system using an IC card, wherein setting information for a desired operation mode is stored on the IC card which the operator inserts into a card reader provided in the copying machine so that the copying machine is automatically set up in accordance with the operation mode setting information that the card reader reads from the IC card. (One such system is disclosed, for example, in Japanese Patent Application Laid-Open No.63-34556(1988)).

In a copying machine having such a function, if setting information for a frequently used operation mode is pre-stored on the IC card, the operation of the copying machine can be simplified since the copying machine can be set up for the desired operation mode just by loading the IC card and without having to take the trouble to go through various steps of operation.

However, the prior art copying machine using an IC card for operation mode setting has required such cumbersome operations as insertion and removal of the IC card for operation mode setting, and hence the problem, for example, that the operator tends to forget to remove the IC card from the machine after the copy operation.

SUMMARY OF THE INVENTION

It is an object of the invention to provide a copying system using an IC card wherein the operation is simplified for setting operation mode information for the copying machine by using the IC card.

It is another object of the invention to provide a copying system using an IC card which is capable of reducing the standby power consumption of the copying machine.

According to the copying system of the invention, operation modes of a copying machine are set using an IC card located at a distance from the copying machine. In the copying system of the invention, the IC card has: means for transmitting a signal that contains an identification code for identifying the transmitting IC card, an identification code for identifying the receiving copying machine, and prestored operation mode setting information for the copying machine; means for receiving a signal transmitted from the copying machine; and means for identifying the receiving copying machine and its operating condition on the basis of the received signal. On the other hand, the copying machine has: means for transmitting a signal that contains an identification code for identifying the transmitting copying machine, an identification code for identifying the receiving IC card, and information including the operating condition of the transmitting copying machine; means for receiving a signal from the IC card; and means for identifying the originating IC card on the basis of the received signal and for setting the copying machine operation mode in accordance with the operation mode setting information contained in the received signal.

According to the invention, since transmission of the operation mode setting information and its associated operations are performed by wireless communication between the copying machine and the IG card storing the operation mode setting information, the operator who holds the IC card can set up the copying machine for the desired operation mode from a location at a distance from the copying machine, which serves to simplify the operation for inputting information when setting the operation mode information for the copying machine by using the IC card. In communications between the IC card and the copying machine, the transmitting and receiving sides are respectively designated by unique identification codes so that interference can be avoided when there is more than one IC card or copying machine, thus ensuring stable communication. Furthermore, since the operating condition of the copying machine is transmitted from the copying machine to the IC card, the holder of the IC card can be notified of the operating condition of the copying machine that is operating in the operation mode preset by the IC card.

In the above copying system, the signal transmitting range of the copying machine is varied according to the state of the copying machine, that is, the transmitting range is switched to a wider range when the copying machine is in an operating mode than when it is in standby mode. In the standby mode, since there is no need to transmit the operating condition of the copying machine to the IC card, a narrower signal transmitting range will sufficiently serve the purpose. Therefore, the signal transmitting range of the copying machine is set in the narrower range during standby and is switched to the wider range only when the copying machine is set in an operating mode, which serves to reduce the power consumption of the copying machine during standby.

The above and further objects and features of the invention will more fully be apparent from the following detailed description with accompanying drawings.

BRIEF DESCRIPTION OF THE DRAWINGS

FIG. 7($b$) is a continuation of the flowchart explaining the operation of the copying machine when it is remote-controlled by the IC card.

DESCRIPTION OF THE PREFERRED EMBODIMENTS

The preferred embodiments of the invention will now be described below with reference to the accompanying drawings.

Figure 1:
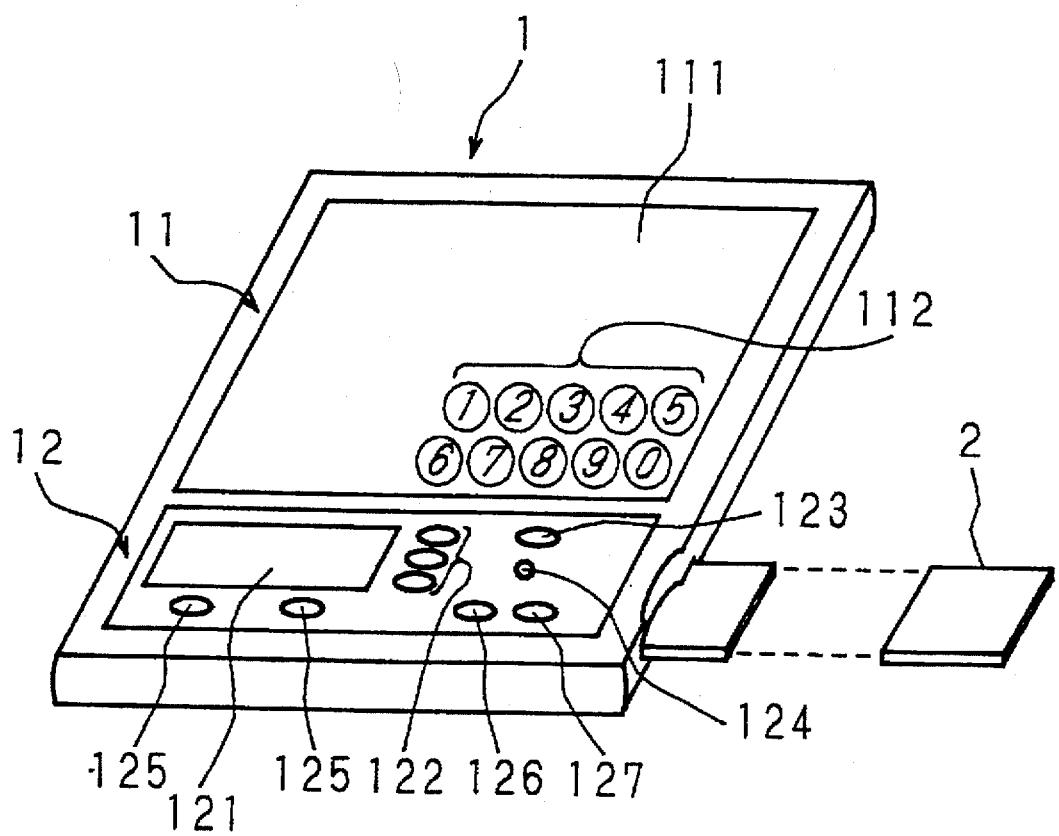
FIG. 1 is a perspective view showing the external appearance of an offline job commander used in a copying system according to the invention.

FIG. 1 is a perspective view showing the external appearance of an offline job commander used in a copying system according to the invention. The offline job commander 1, which is used for setting operation modes for a copying machine, is a rectangular flat panel on the upper surface of which are provided a first operation section 11 and a second operation section 12 which are operated to set the operation modes. An IC card 2 on which the operation mode set by the offline job commander 1 is stored is detachably loaded into the offline job commander 1.

The first operation section 11 consists of a flat tablet 111 used to enter coordinates when editing a document, and a numeric keypad 112 used to enter numeric information, the numeric keypad 112 being formed in one corner of the tablet 111.

The second operation section 12 consists of: a display part 121, e.g. an LCD, for displaying setting information, such as a plurality of setting screens for setting operation modes for a copying machine (such screens hereinafter called the operation mode setting screens); select keys 122 for selecting operation mode setting functions; a clear key 123 for clearing numeric information entered from the numeric keypad 112; a reset key 124 for resetting a CPU of the offline job commander 1; up/down keys 125 used to determine details of each operation mode; an enter key 126 for moving to the next screen after setting an operation mode on an operation mode setting screen; and a back key 127 for returning to the previous screen without determining the setting on the current operation mode setting screen.

In the offline job commander 1, an operation mode is set by operating the first and second operation sections 11 and 12, and the thus set operation mode is stored on the IC card 2.

Figure 2:
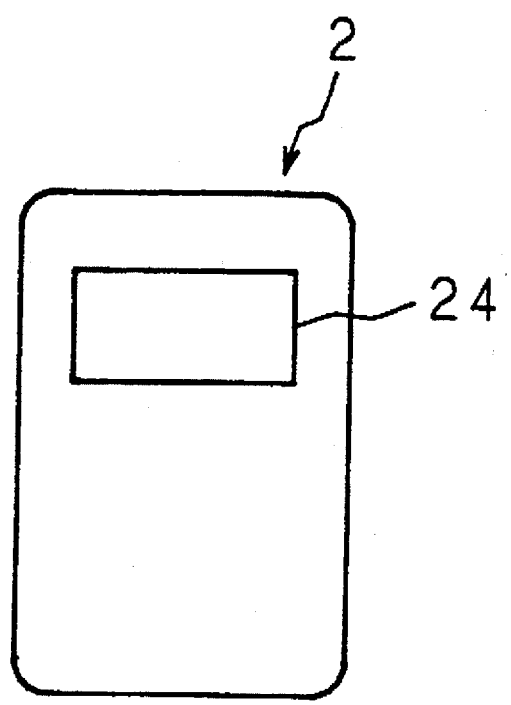
FIG. 2 is a front view showing the external appearance of an IC card.

FIG. 2 is a front view showing the external appearance of the IC card 2. The IC card 2 has on its surface a rectangular LCD 24 for displaying information concerning the operating condition of the copying machine for which the operation mode is set.

Figure 3:
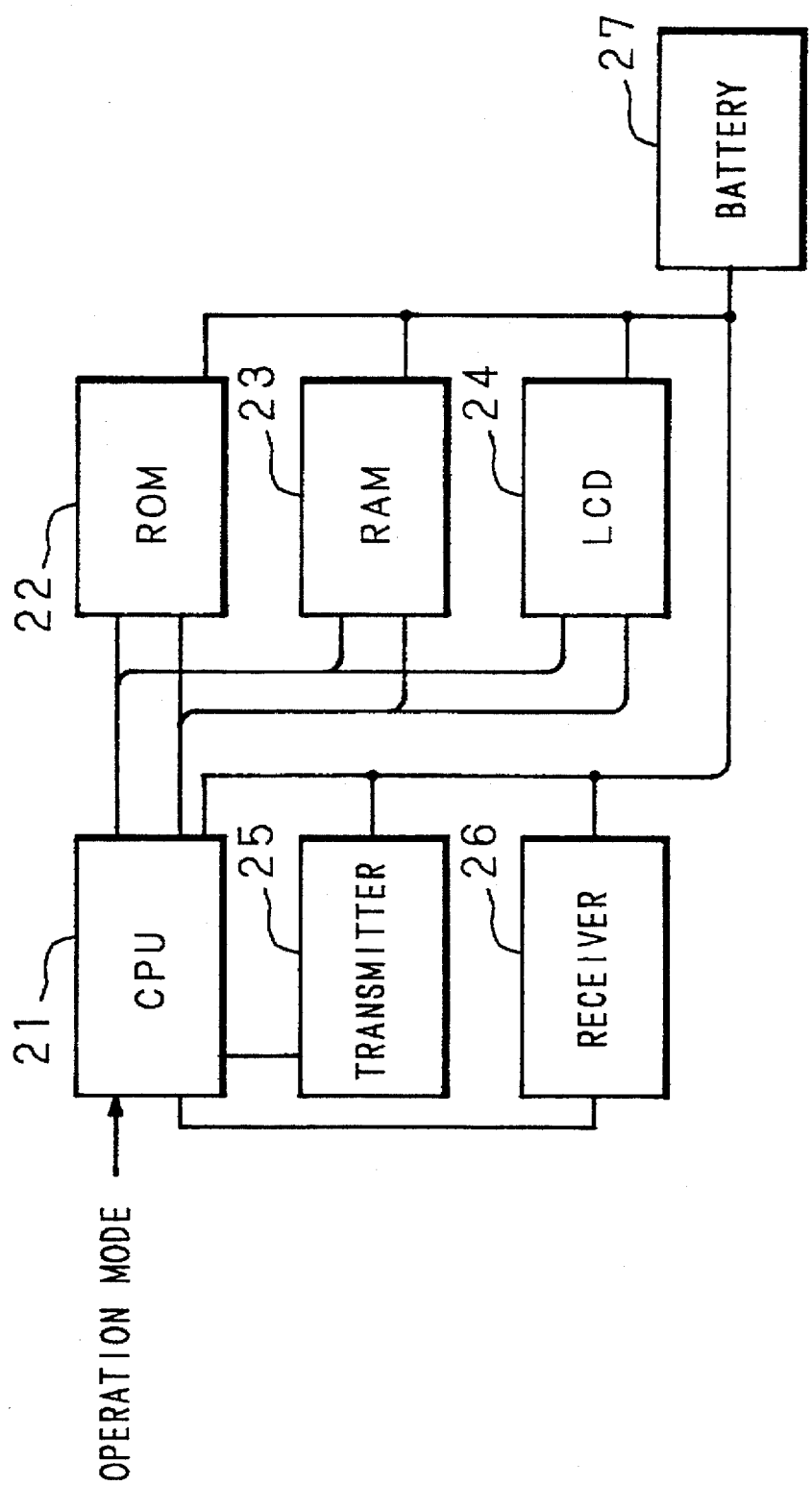
FIG. 3 is a block diagram showing the configuration of an information processing circuit contained in the IC card.

FIG. 3 is a block diagram showing the configuration of an information processing circuit contained in the IC card 2. The IC card 2 includes: a CPU 21 for performing various control operations; a ROM 22 for storing operational programs of the CPU 21; a RAM 23 for storing operation mode setting information; the aforementioned LCD 24; a transmitter 25 for transmitting various kinds of information, including the operation mode setting information, to a copying machine 3 hereinafter described; a receiver 26 for receiving information transmitted from the copying machine 3; and a battery 27 for supplying power to the various component elements of the IC card 2 for their operations. In the IC card 2 of the above configuration, the operation mode setting information set by the offline job commander 1 is stored in the RAM 23 under control of the CPU 21.

Figure 4:
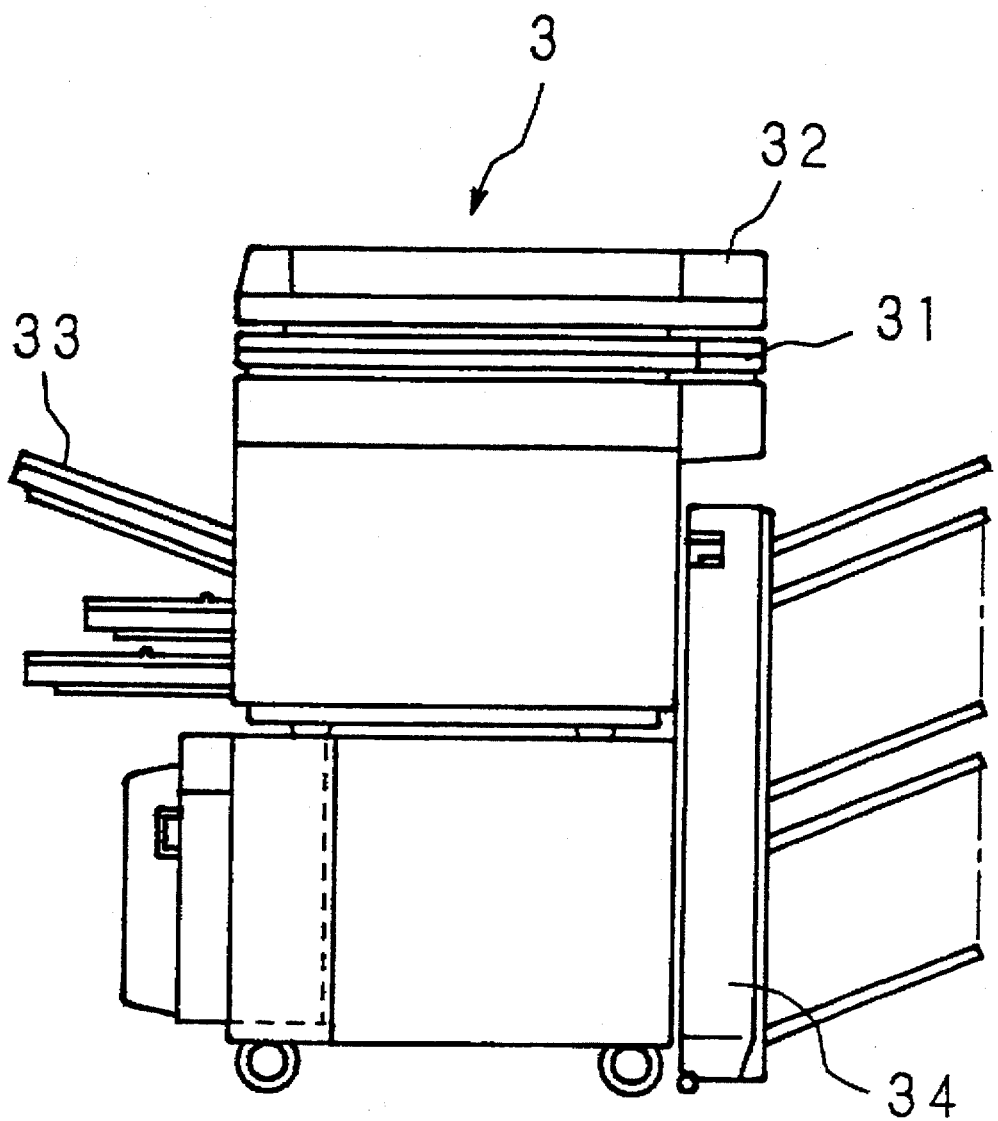
FIG. 4 is a front view of a copying machine that performs a copying operation in accordance with an operation mode preset in the IC card.

FIG. 4 is a front view of the copying machine 3 that performs copy operations in accordance with the operation mode settings stored on the IC card 2. The copying machine 3 has: an operation panel 31 used to set operation modes; an automatic document feeding device 32 for automatically transporting a document placed thereon to a document table (not shown) and for automatically discharging the document after the copy operation is completed; a paper feeding device 33 for feeding paper on which to copy the document; and a sorting device 34 for sorting and discharging copy paper sheets after copying.

Figure 5:
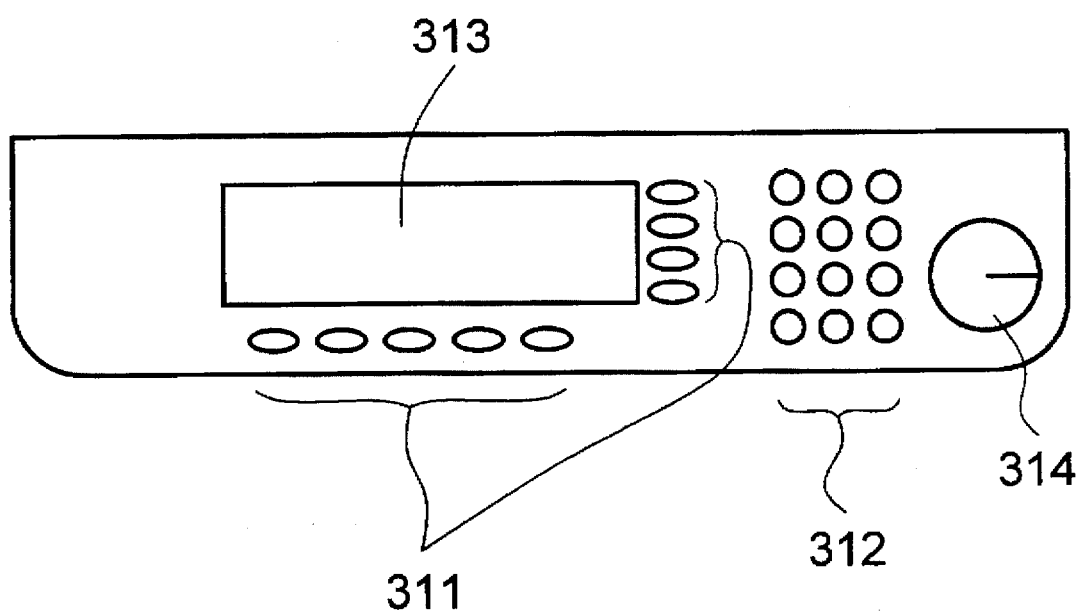
FIG. 5 is a top plan view of an operation panel of the copying machine.

FIG. 5 is a top plan view of the operation panel 31 of the copying machine 3. The operation panel 31 is provided thereon with: mode keys 311 for setting various operation modes; numeric keys 312 for setting the number of copies to be made; a display part 313 for displaying various kinds of information, including data entered from the mode keys 311 and numeric keys 312; and a print key 314 to start a copy operation. The copying machine 3 allows the operator to operate various keys on the operation panel 31 to initiate the copy operation in the desired operation mode.

Figure 6:
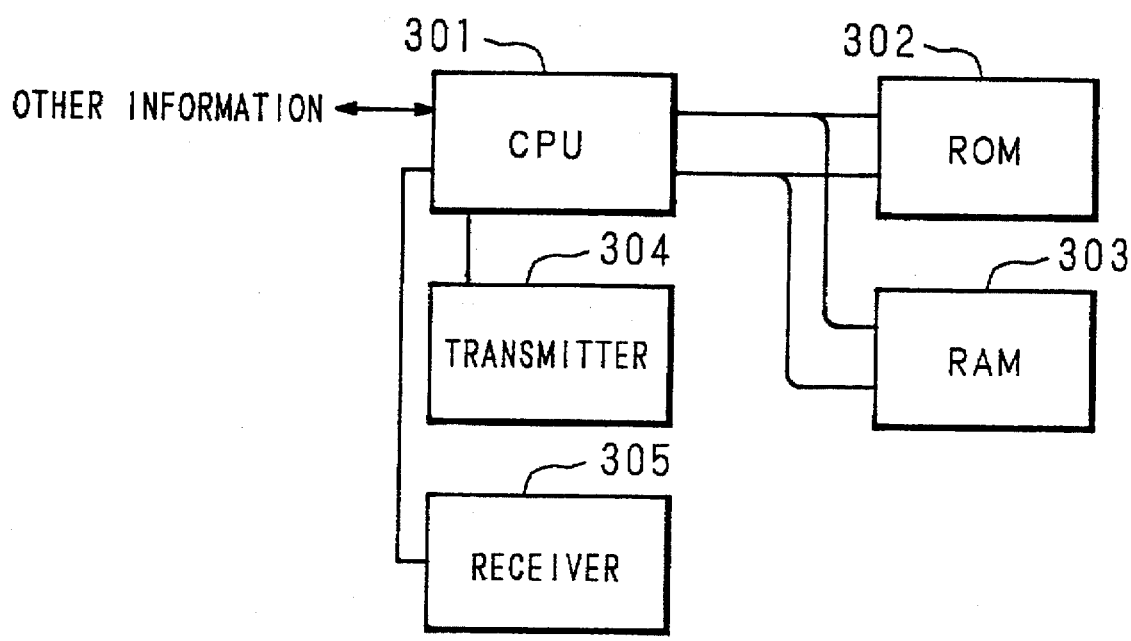
FIG. 6 is a block diagram showing a control circuit provided in the copying machine.

FIG. 6 is a block diagram showing the configuration of a control circuit provided in the copying machine 3. The control circuit has: a CPU 301 for performing various control functions to control the operation of the copying machine 3; a ROM 302 for storing operational programs of the CPU 301; a RAM 303 for storing various parameters necessary for the copy operation; a transmitter 304, having a switchable transmission range, for transmitting various kinds of information to the IC card 2; and a receiver 305 for receiving information transmitted from the IC card 2. Other information, such as the information entered from the operation panel 31 and the information for carrying out the copy operation, is supplied to the CPU 301.

Next, we will describe a method of remote controlling the copying machine 3 by using the IC card 2. First, we will outline a procedure for transferring information between the IC card 2 and the copying machine 3 when the copying machine 3 is remote-controlled using the IC card 2. It is assumed here that a plurality of IC cards 2 are issued, one IC card for each operator of the copying machine 3.

When in standby mode, the copying machine 3, at fixed intervals of time, sends out a signal representing a copying machine code that signifies the identification number of the copying machine 3 and a common card code that is common to all the IC cards 2, the transmitting range of the signal being within one meter radius of the transmitter 304. When the signal is received by any IC card 2 located within the one meter radius of the transmitter 304, and when the common card code is recognized in the signal being transmitted from the transmitter 304, then the IC card 2 reads the copying machine code in the signal and transmits from its transmitter 28 a signal that represents a card code signifying the identification number of the IC card 2 and the copying machine code read by the IC card 2.

The signal thus transmitted from the transmitter 25 is received by the copying machine 3. When the copying machine code of the copying machine 3 is recognized in the received signal, the copying machine 3 determines that the signal is addressed to the copying machine 3, and recognizes the card code contained in the received signal as representing a valid IC card 2 for the copying machine 3. (When signals are received from more than one IC card 2, the first received signal is recognized as representing a valid IC card 2.) The copying machine 3 then sends out from its transmitter 304 a signal representing the card code of the IC card 2 recognized as valid and a request code for requesting transmission of a setting signal representing the operation mode setting stored on the IC card 2.

The signal, containing the request code and sent out from the transmitter 304, is received by the IC card 2 located within the signal transmitting range. When the card code of the IC card 2 is recognized in the received signal, the IC card Z sends out from its transmitter 25 a signal representing the operation mode setting information, set up by the offline job commander 1 and stored in the RAM 23, and the copying machine code of the receiving copying machine 3, in response to the request code contained in the received signal.

The signal, containing the operation mode setting information and sent out from the transmitter 25, is received by the copying machine 3. When the copying machine code of the copying machine 3 is recognized in the received signal, the copying machine 3 modifies the parameters stored in the RAM 303, in accordance with the operation mode setting information contained in the signal, so that the copying machine 3 is set up for the operation mode instructed.

After thus setting the operation mode, when the print key 314 is operated within a prescribed time, the copying machine 3 performs the copy operation in the thus set operation mode. During the copy operation, the copying machine 3 sends out from its transmitter 304 a signal that represents a code indicating the copy operation in progress and the card code of the IC card 2 from which the operation mode setting information has been received. For the transmission of this signal, the transmitting range is switched to a wider range than the first mentioned one-meter radius.

When the signal indicating that the copying machine 3 is in a copying operation is received, the IC card 2 displays the information indicating the operation mode and the operating condition of the copying machine 3 on the LCD 24. In the event that any trouble such as paper jam has occurred in the copying machine 3 during the copying operation, the copying machine 3 sends out a signal representing a code indicating the trouble occurrence along with the card code, with the signal transmitting range set in the wider range as described above. The IC card 2 that has received the signal displays the information indicating the trouble status on the LCD 24, thus notifying the operator at a distance from the copying machine 3 of the operating condition of the copying machine 3.

When the copy operation is completed on the copying machine 3 that has the above functions, the copying machine 3 sends out a signal representing a code indicating the end of the copying operation along with the card code, and is then placed in standby mode. When the signal containing the code indicating the end of the copy operation is received, the IC card 2 displays the information indicating the end of the copy operation on the LCD 24. The displayed information thus notifies the operator that the copy operation is completed. It will be advisable to disable reception of any code from other copying machines or IC cards during the transmission of codes between the copying machine 3 and the IC card 2.

Thus, the above procedure for signal transmission and reception between a particular copying machine 3 and a particular IC card 2 enables the particular copying machine 3 to be remote-controlled by the particular IC card 2 even when there is more than one copying machine 3 or IC card 2 having the same functions as above. Furthermore, by switching the signal transmitting range from the copying machine 3, the transmission power can be held to a minimum necessary level and the power consumption of the copying machine 3 can be reduced.

Figure 7A:
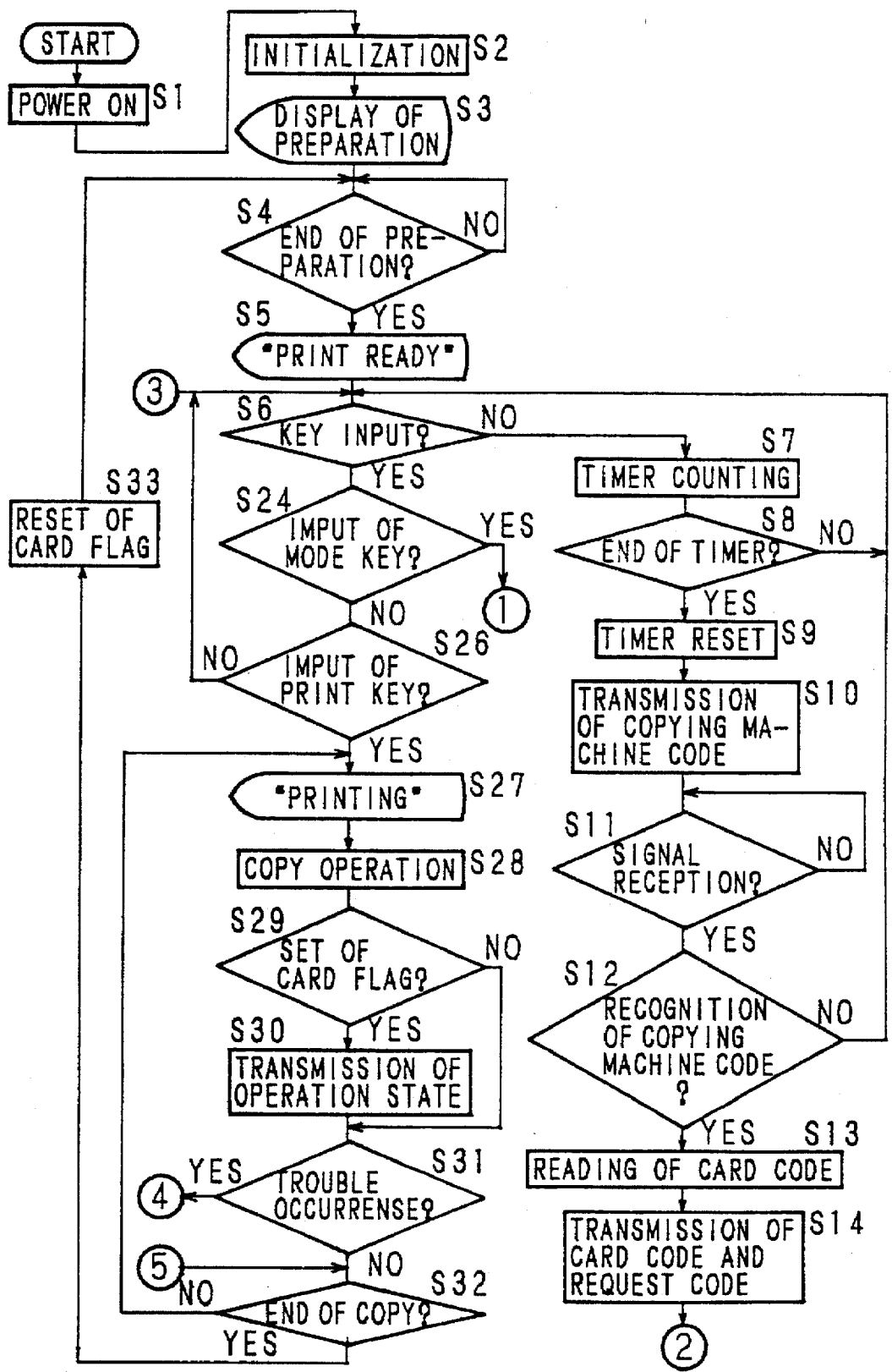
FIG. 7($a$) is a flowchart explaining the operation of the copying machine when it is remote-controlled by the IC card.
Figure 7B:
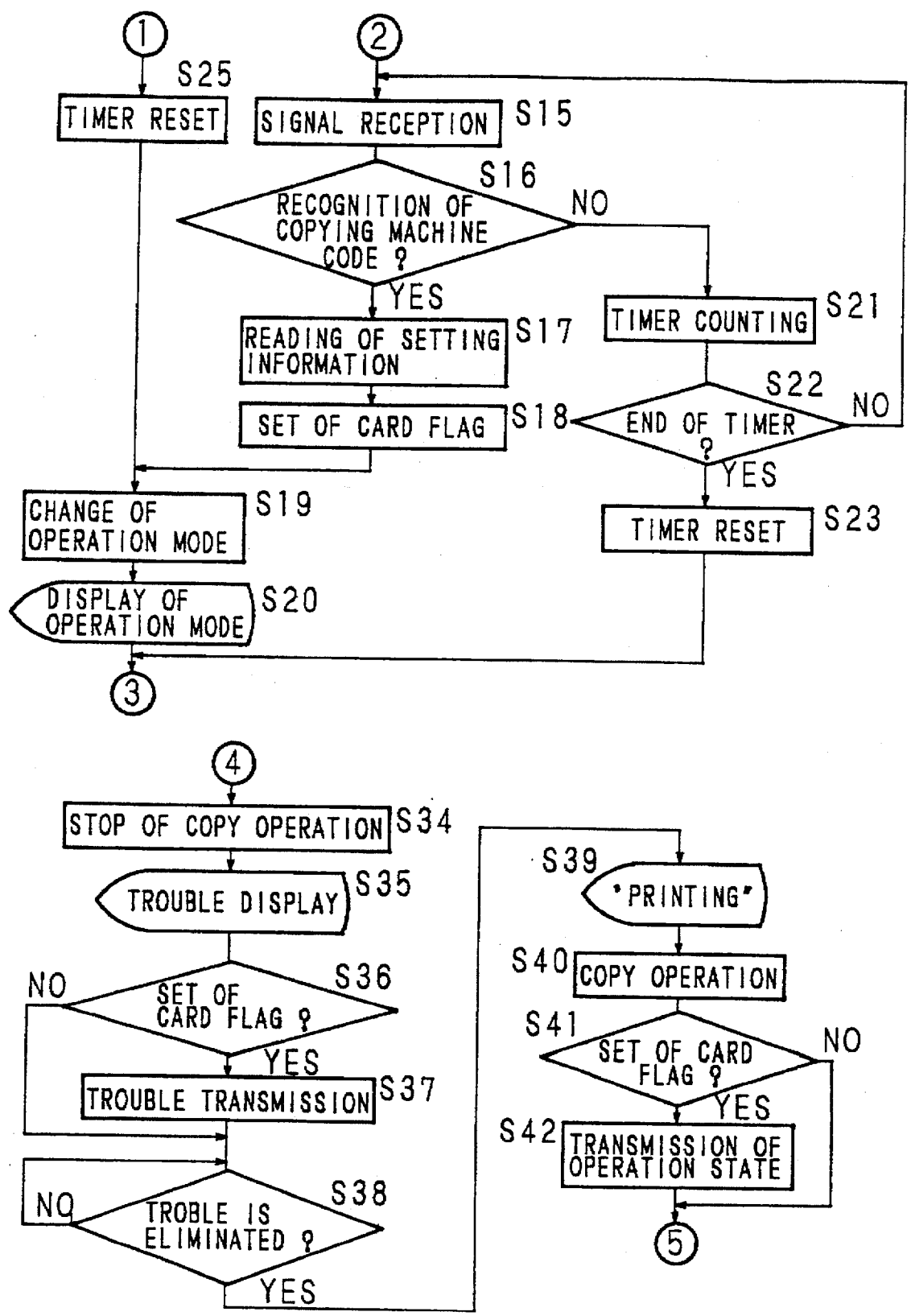

We will now describe a specific example of how the signals are processed in the IC card 2 and the copying machine 3 to implement the above-described procedure for transmission and reception between them. FIG. 7 is a flowchart explaining the operation of the copying machine 3 when it is remote-controlled by the IC card 2.

First, when power is turned on to the copying machine 3 (step S1), timers, flags, etc. are reset to initialize the CPU 301 (step S2). The display then shows that the copying machine 3 is in the process of preparation (step S3) to ready it for a copy operation, the preparation including, for example, warming up of the fixing unit in the copying machine 3.

When the preparation is completed (step S4), the copying machine 3 is placed on standby for a copy operation with a "PRINT READY" message displayed on the display part 313 (step S5). During the standby mode, it is checked if any key input is made from the mode keys 311, the numeric keys 312, or the print key 314 (step S6); if it is determined that no key inputs are made, timer counting is started (step S7), and it is checked whether a prescribed number of counts has been reached (step S8).

In step S8, if it is determined that the prescribed number of counts has not yet been reached, the process returns to step S6 to check if any key input is made, repeating the steps S6, S7, and S8 until the timer counting is completed. If it is determined in step S8 that the prescribed number of counts has been reached, then the timer is reset (step S9), and a signal representing the copying machine code and the common card code is sent out at fixed intervals of time, the signal transmitting range being set within a one-meter radius of the transmitter 304 (step S10).

Next, it is determined whether a signal transmitted from the IC card 2 has been received by the receiver 305 (step S11), and only when it is determined that the signal has been received from the IC card 2, it is checked whether the copying machine code of the copying machine 3 is contained in the received signal (step S12). If it is determined in step S12 that the copying machine code of the copying machine 3 is not contained in the received signal, then the process returns to step S6 to repeat the above-described processing. On the other hand, when it is determined in step S12 that the copying machine code of the copying machine 3 is contained in the received signal, the card code contained in the signal is read (step S13). At this stage, mutual identification is established between the copying machine 3 and the IC card 2.

Next, the transmitter 304 transmits a request code and a card code for the purpose of requesting the identified IC card 2 to send operation mode setting information (step S14). In response, the IC card 2 sends out a signal, which is received by the receiver 305 (step S15). It is then checked if the copying machine code of the copying machine 3 is recognized in the received signal (step S16).

When it is determined in step S16 that the copying machine code of the copying machine 3 is recognized in the received signal, the operation mode setting information contained in the signal is read (step S17), and a card flag is set (step S18), indicating that the operator of the copying machine 3 is using the IC card 2. The operation mode setting is then changed in accordance with the operation mode setting information that has been read in step S17 (step S19), and the operation mode after change is displayed on the display part 313 (step S20). The process then returns to step S6.

On the other hand, if it is determined in step S16 that the copying machine code of the copying machine 3 is not recognized in the received signal, timer counting is started (step S21), and it is checked whether a prescribed number of counts has been reached (step S22).

If it is determined in step S22 that the prescribed number of counts has not been reached, the process returns to step S15 to repeat the processing of steps S15, S16, S21, and S22 until the counting is completed, thereby repeating the process of receiving the signal from the IC card 2 to identify the copying machine code. When it is determined in step S22 that the prescribed number of counts has been reached, then it is decided that the operator holding the card 2 has no intention of using the copying machine 3 and has moved away from the vicinity thereof, as a result of which the timer is reset (step S23) and the process returns to step S6.

In this manner, the copying machine 3 is set up in accordance with the operation mode setting information stored on the IC card 2 before the holder of the IC card 2 approaches the copying machine 3. The operator (the holder of the IC card 2) then places a document on the copying machine 3 thus set up for the operation mode, checks the operation mode displayed, and makes changes, if necessary, to the operation mode setting by operating the mode keys 311. When the desired operation mode has been set, the print key 314 is pressed ON.

In step S6, when it is determined that any one key has been pressed, then it is checked if the key input is made from any one of the mode keys 311 (step S24). If it is determined in step S24 that any of the mode keys 311 has been pressed, then it is decided that the operator is operating the operation panel 31 to make an operation mode setting, in which case, in order to prevent the operation mode setting from being changed by the IC card 2, the timer for copying machine code transmission is reset (step S25) each time any one of the mode keys 311 is pressed. The process then proceeds to step S19 where the operation mode setting is changed in accordance with the operation mode setting information as modified by operating the mode keys 311, after which the operation mode thus set is displayed on the display part 313 (step S20) and the process returns to step S6.

On the other hand, if it is determined in step S24 that the key input is not made from the mode keys 311, then it is checked if the print key 314 has been pressed (step S26). If it is determined in step S26 that the print key 314 has been pressed, a "PRINTING" message is displayed on the display part 313 (step S27) and a copy operation is started in the above-set operation mode (step S28).

Next, to determine whether the operator is using the IC card 2, it is checked if the card flag is set (step S29), and only when it is determined that the card flag is set, the transmission range of the transmitter 304 is switched to the wider range mode whereby the transmitter 304 sends out a signal indicating the operating condition, i.e. a signal representing a code that indicates the copy operation in progress and the card code of the IC card 2 from which the operation mode setting information has been received (step S30).

Then, it is checked if any trouble such as paper jam has occurred during the copy operation (step S31). If it is determined in step S31 that no trouble has occurred during the copy operation, then it is checked whether the copy operation is completed (step S32). If it is determined in step S32 that the copy operation is not yet completed, the process returns to step S27, repeating the processing of steps S27–S32 until the copy operation is completed.

On the other hand, if it is determined in step S32 that the copy operation is completed, the card flag is reset (step S33) and the process returns to step S4 to repeat the processing of steps S4–S32.

In step S31, if it is decided that any trouble has occurred during the copy operation, the copy operation is stopped (step S34) and the trouble status is displayed on the display part 313 (step S35). Then, it is checked whether the card flag is set (step S36), and only when it is determined that the card flag is set, the transmitter 304 sends out a signal representing the copying machine code, a code indicating the trouble occurrence, and the card code (step S37).

Then, the process waits until the trouble is eliminated (step S38), and when the trouble is eliminated, the "PRINTING" message is displayed on the display part 313 (step S39), and the suspended copy operation is resumed (step S40).

It is then checked whether the card flag is set (step S41). When it is determined in step S41 that the card flag is set, the transmitter 304 sends out a signal indicating the operating condition, i.e. a signal representing the copying machine code, a code indicating the copy operation in progress, and the card code of the IC card 2 from which the operation mode setting information has been received (step S42), and the process proceeds to S32. On the other hand, if it is determined in step S41 that the card flag is not set, the process jumps to step S32.

By carrying out the above steps of operation, the copying machine 3 identifies a particular IC card 2 that the operator has from among a plurality of IC cards 2, and the copying machine 3 operates in accordance with the operation mode setting transmitted from the IC card 2 while transmitting the operating condition of the copying operation to the IC card 2.

Figure 8:
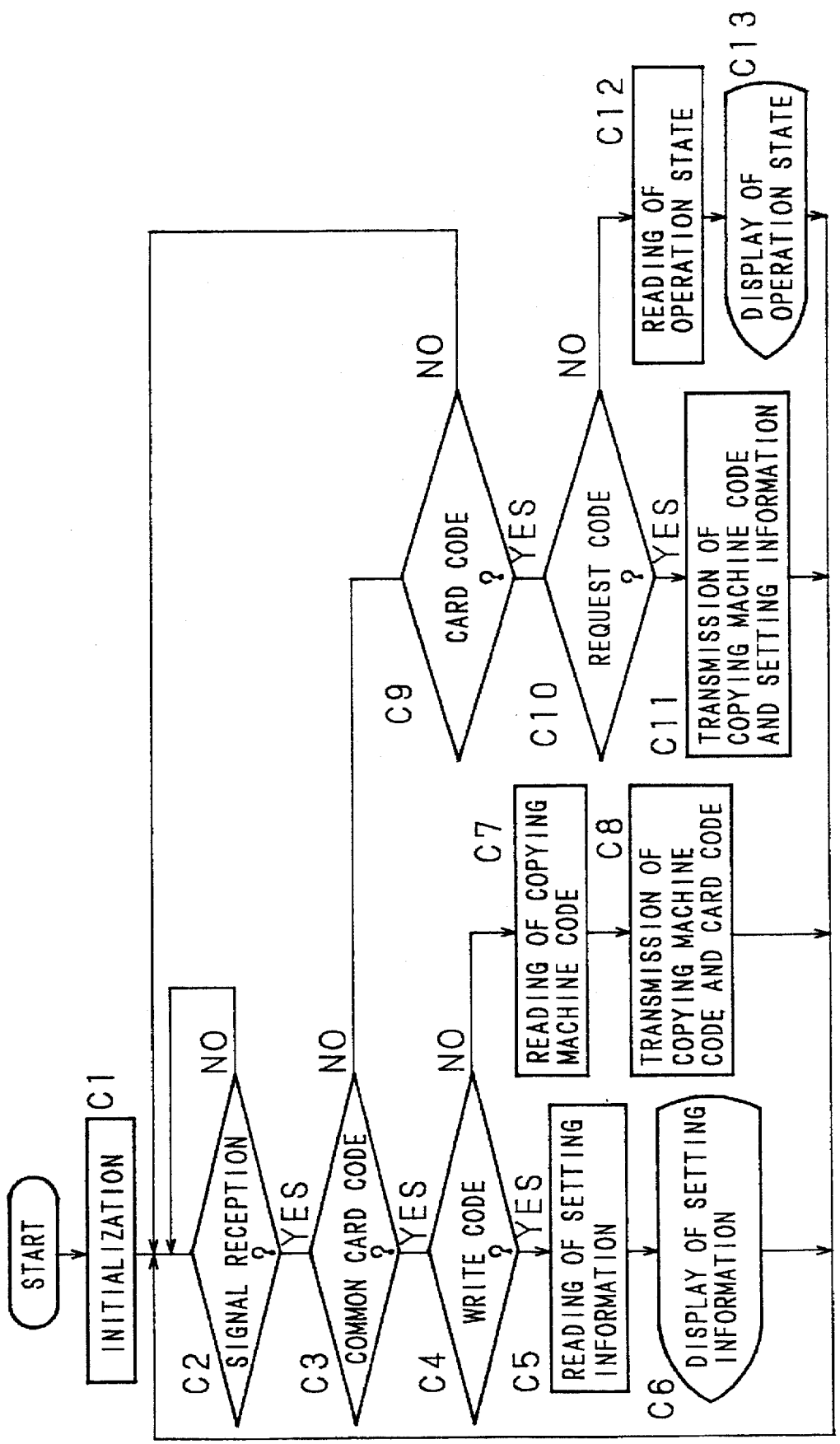
FIG. 8 is a flowchart explaining the operation of the IC card when remote-controlling the copying machine.

FIG. 8 is a flowchart explaining the operation of the IC card 2 when remote-controlling the copying machine 3.

When the battery 27 is set in the IC card 2, the IC card 2 starts operating. First, the LCD 24, the transmitter 25, the receiver 26, etc. are initialized (step C1). Next, it is determined if there is any signal reception from the copying machine 3 (step C2), and only when the signal from the copying machine 3 is received, it is checked whether the common card code is contained in the received signal (step C3).

When it is determined in step C3 that the common card code is contained in the received signal, then it is checked whether a write code is contained in the received signal (step C4). If it is determined in step C4 that a write code is contained in the received signal, then it is decided that operation mode setting information is being written from the offline job commander 1; therefore, the setting information is read into the IC card 2 (step C5) and the thus read information is displayed on the LCD 24 (step C6). The process then returns to step C2.

If the IC card 2 is of the type capable of storing more than one setting information, the program number that should hold the information is specified through the offline job commander 1 when writing the information to the IC card 2. When reading the setting information, the IC card 2 reads the program number being written and stores the setting information in the specified area of the RAM 23 in accordance with the program number.

On the other hand, when it is determined in step C4 that no write code is contained in the received signal, then it is decided that the signal is one that has been transmitted from the copying machine 3, and the IC card 2 reads and stores the copying machine code contained in the received signal (step C7) and sends out from its transmitter 25 a signal representing the copying machine code and the card code of its own. The process then returns to step C2.

In step C3, if it is determined that no common card code is contained in the received signal, then it is checked whether the card code of its own is contained in the signal (step C9). If it is determined in step C9 that the card code of its own is not contained in the received signal, the process returns to step C2. On the other hand, if it is determined in step C9 that the card code of its own is contained in the received signal, then it is checked whether the request code is contained in the received signal (step C10).

When it is determined in step C10 that the request code is contained in the received signal, the transmitter 25 sends out a signal representing the copying machine code and the operation mode setting information stored in the RAM 23

(step C11), and the process returns to step C2. In transmitting the operation mode setting information, if the IC card 2 is of the type capable of storing more than one setting information, priorities should be allocated to the stored setting information so that the information can be transmitted in priority order. Alternatively, the operation mode setting information may be transmitted starting with the last one input by the offline job commander 1, or selector keys for selecting the setting information may be provided on the IC card 2 so that the operator may select the setting information for transmission by operating the selector keys.

When the signal representing the copying machine code and the operation mode setting information is transmitted, the copying machine code contained in the signal is stored in the IC card 2, as described above. This enables the IC card 2 to receive the signal indicating the operating condition from the copying machine 3 and display the operating condition for each setting information.

If, in step C10, it is determined that the request code is not contained in the received signal, it is then decided that the received signal is the signal notifying the operating condition from the copying machine 2, and the IC card 2 reads the information indicating the operating condition (step C12) and displays the operating condition on the LCD 24 (step C13). The process then returns to step C2.

By carrying out the above steps of operation, the IC card 2 can receive the signal notifying the operating condition of the copying machine 3 and display the operating condition for each setting information even when the IC card 2 is of the type capable of storing more than one setting information.

As described above, according to the invention, the copying machine 3 can be set up in accordance with the operation mode setting stored on the IC card 2 from a location at a distance from the copying machine 3, by exchanging signals between the copying machine 3 and the IC card 2 in accordance with the above-described procedure.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof, are therefore intended to be embraced by the claims.

What is claimed is:

1. A copying system consisting of a copying machine and a copying condition setting device for setting copying conditions for the copying machine by means of wireless communication, comprising:
   transmitting means of the copying machine, for transmitting various kinds of information;
   receiving means of the copying condition setting device, for receiving the information transmitted from said transmitting means of the copying machine;
   transmitting means of the copying condition setting device, for transmitting various kinds of information in accordance with the information received by said receiving means of the copying condition setting device; and
   receiving means of the copying machine, for receiving the information transmitted from said transmitting means of the copying condition setting device;
   wherein
   said transmitting means of the copying machine transmits information for identifying the copying machine, and said receiving means of the copying condition setting device receives the transmitted information and thereby identifies the copying machine, whereupon said transmitting means of the copying condition setting device transmits information for identifying the copying condition setting device to the identified copying machine.

2. A copying system as set forth in claim 1, wherein the information that said transmitting means of the copying machine transmits contains: a common card code for identifying a group of copying condition setting devices that are associated with the copying machine; a copying machine code unique to the copying machine; a card code unique to the copying condition setting device; and a request code for requesting transmission of copy information for setting copying conditions.

3. A copying system as set forth in claim 1, wherein
   the information that said transmitting means of the copying condition setting device transmits contains: a card code unique to the copying condition setting device; a copying machine code unique to the copying machine; and copy information for setting copying conditions.

4. A copying system as set forth in claim 1, further comprising:
   display means, provided in the copying condition setting device, for displaying information concerning the operating condition of the copying machine transmitted from said transmitting means of the copying machine.

5. A copying system as set forth in claim 1, wherein
   when there is more than one copying machine against only one copying condition setting device, said transmitting means of the copying machine transmits a copying machine code and the copying condition setting device that has received the copying machine code transmits copy information to the copying machine from which the copying machine code is transmitted.

6. A copying system as set forth in claim 1, wherein
   when there is more than one copying condition setting device against only one copying machine, any one copying condition setting device that has received the copying machine code transmits a card code and copy information to the copying machine by means of said transmitting means of the copying condition setting device.

7. A copying system as set forth in claim 1, wherein the copying condition setting device is an IC card.

8. A copying condition setting device having a function of transmitting and receiving various kinds of information by communicating with a plurality of copying machines, comprising:
   receiving means for receiving information transmitted via wireless communications from any one of a plurality of copying machines a copying machine code that is unique to said one copying machine; and
   transmitting means for transmitting via wireless communications copy information for setting copy conditions in the copying machine from which the copying machine code received by said receiving means was transmitted.

9. A copying condition setting device as set forth in claim 8, further comprising:
   display means for displaying operating condition information transmitted from the copying machine.

10. A copying condition setting device as set forth in claim 8, wherein
    the copying condition setting device is an IC card.

11. A copying condition setting device having a function of transmitting and receiving various kinds of information by communicating with a copying machine, comprising:

a transmitter means for transmitting to the copying machine copy information for setting copying conditions along with a card code unique to the copying condition setting device for distinction from other copying condition setting devices.

12. A copying condition setting device as set forth in claim 11, further comprising:

display means for displaying operating condition information transmitted from the copying machine.

13. A copying condition setting device as set forth in claim 11, wherein the copying condition setting device is an IC card.

14. A copying condition setting device having a function of transmitting and receiving various kinds of information by communicating with a plurality of copying machines, comprising:

receiving means for receiving information transmitted via wireless communications from any one of a plurality of copying machines a copying machine code that is unique to said one copying machine; and transmitting means for transmitting via wireless communications to said one copying machine copy information for setting copying conditions along with a card code unique to the copying condition setting device that has received the copying machine code, for distinction from other copying condition setting devices.

15. A copying condition setting device as set forth in claim 14, further comprising:

display means for displaying operating condition information transmitted from the copying machine.

16. A copying condition setting device as set forth in claim 14, wherein the copying condition setting device is an IC card.

17. A copying machine having a function of transmitting and receiving various kinds of information by communicating with a plurality of copying condition setting devices, comprising:

receiving means for receiving via wireless communications from any one of a plurality of copying condition setting devices copy information for setting copying conditions along with a card code unique to said one copying condition setting device.

18. A copying machine as set forth in claim 17, wherein each of the copying condition setting devices is an IC card.

19. A copying machine having a function of transmitting and receiving various kinds of information by communicating with a copying condition setting device, comprising:

transmitting means for transmitting via wireless communications a copying machine code unique to the copying machine for distinction from other copying machines; and receiving means for receiving via wireless communications the copying machine code and copy information for setting copying conditions.

20. A copying machine as set forth in claim 19, wherein the copying condition setting device is an IC card.

21. A copying machine having a function of transmitting and receiving various kinds of information by communicating with a plurality of copying condition setting devices, comprising:

transmitting means for transmitting via wireless communications a copying machine code unique to the copying machine for distinction from other copying machines, a card code unique to a copying condition setting device, and a request code for requesting transmission of copy information for setting copying conditions; and receiving means for receiving information transmitted via wireless communications;

wherein when the card code is received by said receiving means along with the copying machine code, said transmitting means transmits the request code, along with the card code, requesting the copying condition setting device for transmission of the copy information.

22. A copying machine as set forth in claim 21, wherein each of the copying condition setting devices is an IC card.

23. A method of mutual identification, comprising the steps of:

transmitting a code that is unique to a first device from said first device to a second device by means of wireless communications;

receiving the unique code of the first device at the second device;

transmitting from the second device a code that is unique to said second device, along with the unique code of the first device, by means of wireless communications;

receiving at the first device the unique code of the second device transmitted along with the unique code of the first device; and identifying the second device in the first device as a valid device from the received codes.

24. A method of mutual identification between a copying machine and a copying condition setting device, comprising the steps of:

transmitting from the copying machine via wireless communications a common card code for identifying a group of copying condition setting devices associated with the copying machine and a copying machine code unique to the copying machine;

receiving at the copying condition setting device the common card code and copying machine code transmitted from the copying machine;

identifying at the copying condition setting device the copying machine from which the received copying machine code is transmitted, to establish data transmission and reception to and from the copying machine;

transmitting from the copying condition setting device via wireless communications the copying machine code, along with a card code unique to the copying condition setting device, to the identified copying machine;

receiving at the copying machine the card code along with the copying machine code unique to the copying machine; and identifying at the copying machine the copying condition setting device from which the received card code is transmitted, to establish data transmission and reception to and from the copying condition setting device.

25. A method of mutual identification as set forth in claim 24, wherein the copying condition setting device is an IC card.

26. A copying system consisting of a copying machine and a copying condition setting device, for setting copying conditions of the copying machine, said system comprising:

first communication means provided in the copying machine, for transmitting and receiving various information to and from the copying condition setting device; and second communication means provided in the copying condition setting means, for transmitting and receiving various information to and from the copying machine;

wherein information for identifying the copying machine is contained in the information transmitted and received by the first and second communication means.

27. The copying system of claim 26, wherein the information transmitted by said second communication means also contains information for identifying the copying condition setting device.

28. A copying system, comprising:

a copying machine including a transmitting device for transmitting information including data which identifies the copying machine; and a copy condition setting device having a receiver for receiving the information transmitted by said copying machine, and a transmitter for transmitting information to said copying machine which includes an identification of said copy condition setting device.

29. A device which communicates with an external setting device for setting at least one operational condition of said device, comprising:

a receiver which receives information transmitted by means of wireless data transmission from the external setting device;

a transmitter which transmits information by means of wireless data transmission to the external setting device; and a controller which is connected with said receiver and said transmitter, said controller executing the steps of;
 (a) receiving information received from the external setting device via said receiver;
 (b) determining whether identifying data included in the received information is for the device or not, the identifying data being unique to a specific device; and
 (c) transmitting information including request data to the external setting device via said transmitter in the case where the determination of step (b) is affirmative.

30. The device as claimed in claim 29, wherein the request data is data for requesting the external setting device to send further information.

31. The device as claimed in claim 29, wherein said device is a copying machine.

32. A setting device for setting at least one operational condition of at least one external device, said setting device comprising a transmitter which transmits first identifying data along with second identifying data by means of wireless data transmission, the first identifying data being unique to a specific device and the second identifying data being unique to said setting device.

33. A setting device for setting at least one operational condition of at least one external device, said setting device comprising a transmitter which transmits identifying data along with command data by means of wireless data transmission, the identifying data being unique to a specific device and the command data having the function of setting the specific device in an operational condition.

34. A device which communicates with at least one external setting device for setting at least one operational condition of said device, comprising a transmitter which transmits identifying data along with request data by means of wireless data transmission, the identifying data being unique to a specific setting device and the request data requesting the specific setting device to send information.

35. A device which communicates with at least one external setting device for setting at least one operational condition of said device, comprising a transmitter which transmits identifying data along with condition data by means of wireless data transmission, the identifying data being unique to a specific setting device and the condition data representing the condition of said device.

36. The device as claimed in claim 35, wherein the condition data represents that said device is in a trouble condition.

37. The device as claimed in claim 35, wherein the condition data represents that said device is operational.

38. The device as claimed in claim 35, wherein the condition data represents that said device has completed a specific item of work.

39. A setting device for setting at least one operational condition of an external device, said setting device comprising:

a transmitter which transmits information by means of wireless data transmission to the external device;

a receiver which receives information transmitted by means of wireless data transmission from the external device; and a controller which is connected with said transmitter and said receiver, said controller executing the steps of;
 (a) receiving information from the external device via the receiver;
 (b) determining whether identifying data included in the received information is for the setting device or not, the identifying data being unique to a specific setting device; and
 (c) transmitting further information via the transmitter in the case where the determination of step (b) is affirmative.

40. A setting device for setting at least one operational condition of an external device, said setting device comprising:

a receiver which receives information transmitted by means of wireless data transmission from the external device;

a display; and a controller which is connected with said receiver and said display, said controller executing the steps of;
 (a) receiving information from the external device via said receiver, the information including data for indicating a condition of the external device; and
 (b) displaying the condition of the external device according to the data by using the display.

41. The setting device as claimed in claim 40, wherein the data represents that the external device is in a trouble condition.

42. The setting device as claimed in claim 40, wherein the data represents that the external device is operational.

43. The setting device as claimed in claim 40, wherein the data represents that the external device has completed a specific item of work.

* * * * *